May 14, 1963  J. R. JOHNSON ET AL  3,089,254
OVEN FOR TREATING ARTICLES
Filed Aug. 21, 1959  3 Sheets-Sheet 1

INVENTORS.
JOHN R. JOHNSON,
ELMER B. VOSS &
BY FRANCIS S. WRIGHT.
J. R. Nelson
+ W. A. Schaich
ATTORNEYS.

May 14, 1963  J. R. JOHNSON ET AL  3,089,254
OVEN FOR TREATING ARTICLES
Filed Aug. 21, 1959  3 Sheets-Sheet 2
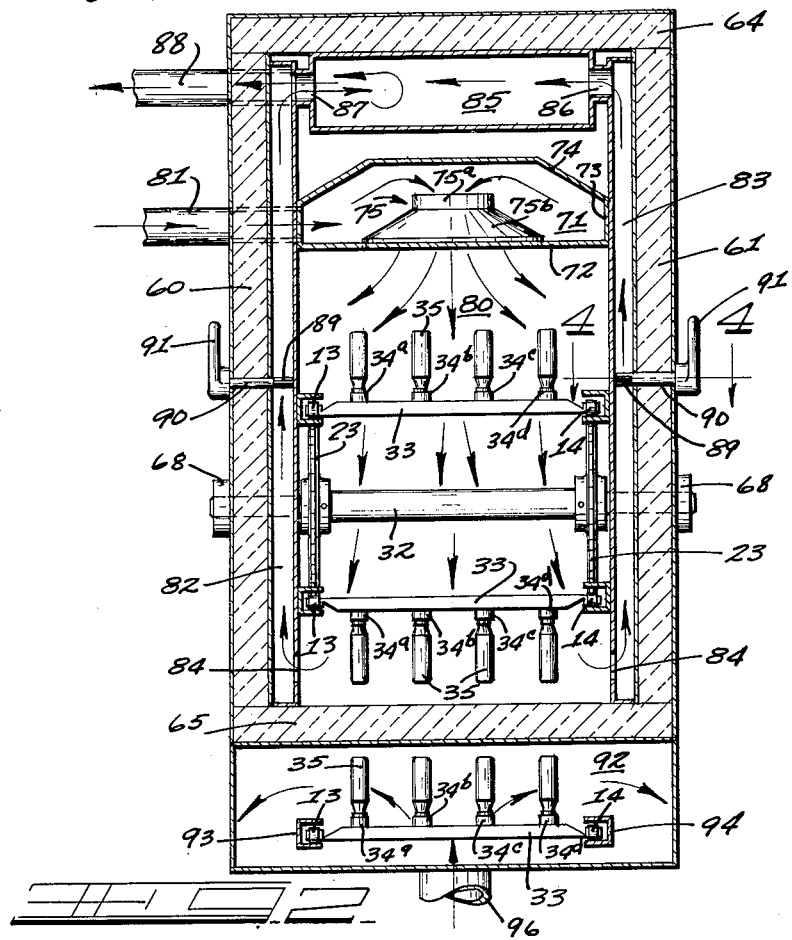
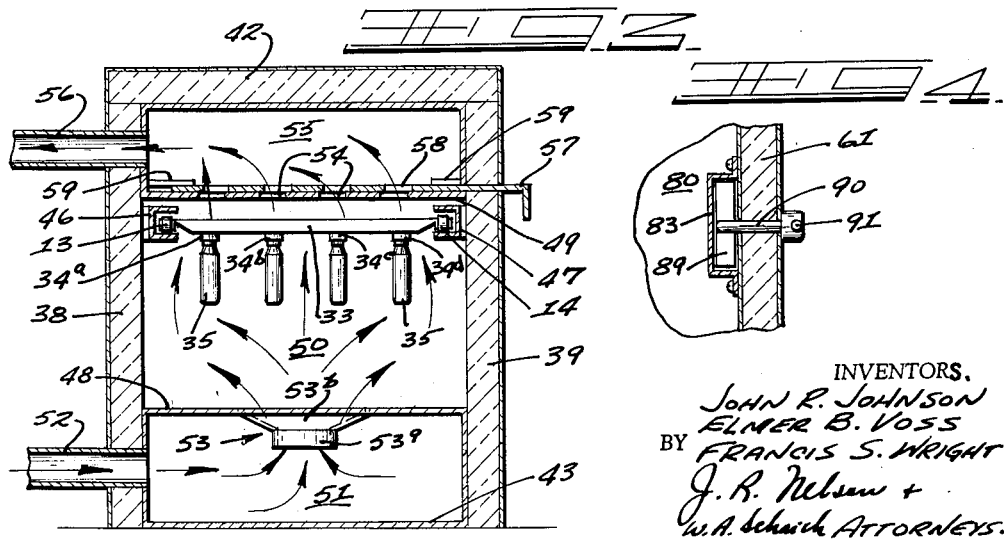
INVENTORS.
JOHN R. JOHNSON
ELMER B. VOSS
BY FRANCIS S. WRIGHT
J. R. Nelson +
W. A. Schmidt ATTORNEYS.

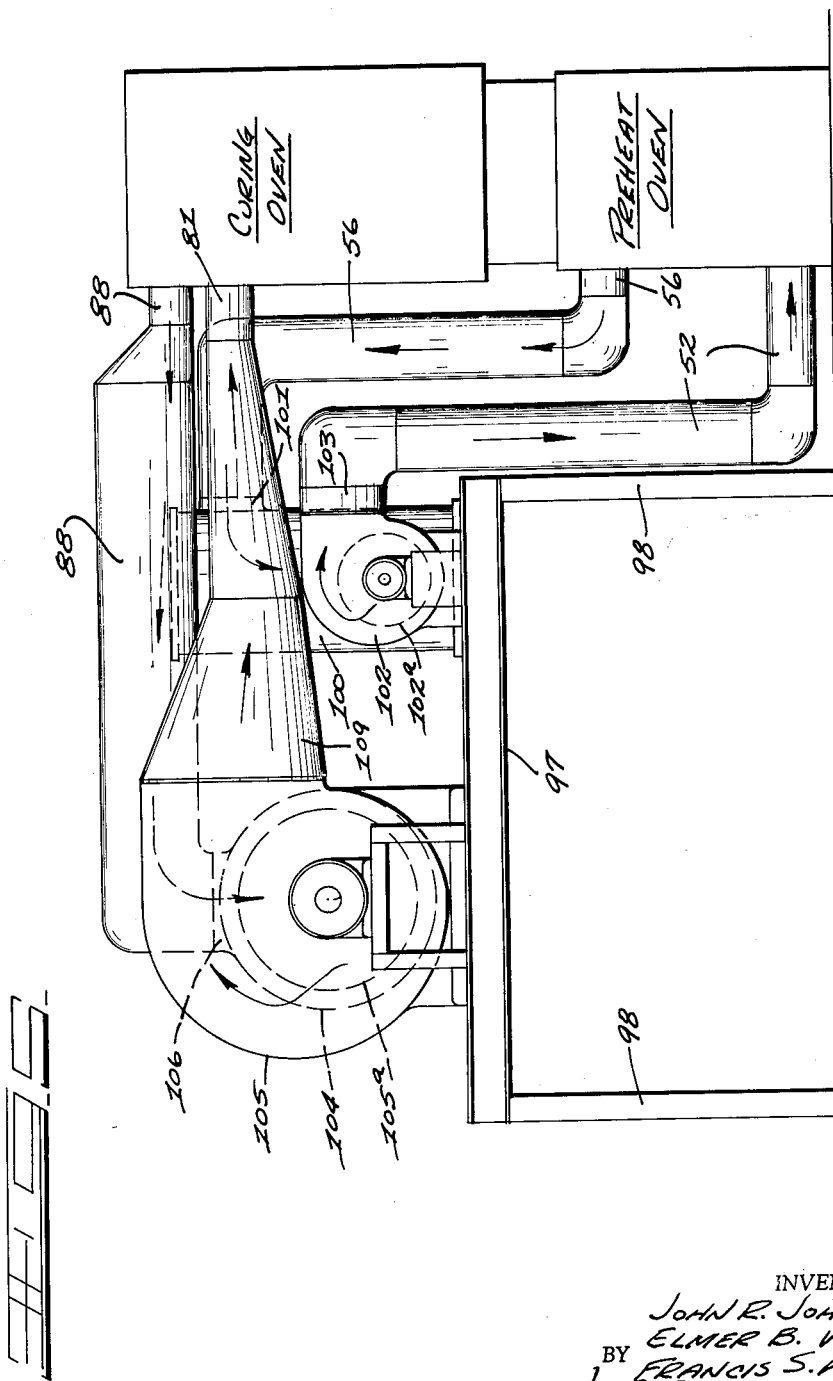

United States Patent Office 3,089,254
Patented May 14, 1963

3,089,254
OVEN FOR TREATING ARTICLES
John R. Johnson, Elmer B. Voss, and Francis S. Wright, Toledo, Ohio, assignors to Owens-Illinois Glass Company, a corporation of Ohio
Filed Aug. 21, 1959, Ser. No. 835,329
7 Claims. (Cl. 34—207)

The present invention relates to ovens for treating articles while conveyed therethrough, such as, heat treatment or conditioning articles in a coating process prior to application of the coating, and curing the coating on the articles after it is applied.

An oven of the type with which the present invention is concerned consists of an elongated and relatively narrow structure which heats articles on a carriage while continuously moving in an endless path which extends through the oven.

In such structure, it is important to maintain a uniform and closely regulated temperature throughout the oven. Also, since the oven of this type is relatively narrow, it may be expected to be relatively inefficient.

It is, therefore, an object of the present invention to provide an elongated oven structure of the type mentioned, in which temperature is maintained uniformly and controllable within a desired narrow range.

Another object is to provide such an oven that is improved in efficiency and is economical to operate.

A further object of the invention is to provide an oven of the type mentioned, wherein the heated air is circulated across the conveyed articles therein, and this air removed from the oven by a regulable exhaust and recirculated through an air heater system and thence back to the oven.

A still further object of the invention is the provision of efficient diffusers of the heated air in the form of anemostats for obtaining more uniform transverse distribution of the heated air, and thereby obtain the aforestated objects of the invention.

Other objects and advantages will become apparent from the following description, taken in conjunction with the annexed sheets of drawings on which, by way of a preferred example, is illustrated two forms of the invention and a practical adaptation of both.

On the drawings:

FIG. 2 is a sectional end elevational view taken along lines 2—2 of FIG. 1, and which illustrates the construction and operation of one form of the present invention as a curing oven for heat-treating articles after they are coated by the machine and while they are continuously conveyed therethrough.

FIG. 3 is a sectional end elevational view taken along lines 3—3 of FIG. 1, and which illustrates the construction and operation of a second form of the invention as a preheating oven for heat-treating the articles prior to their being coated by the machine, and while they are continuously conveyed therethrough.

FIG. 4 is a detailed sectional plan view taken along line 4—4 of FIG. 2.

FIG. 5 is an end elevational view which shows the air heaters and air blowers for supplying heated air to the mentioned preheating oven and the curing oven employed in the continuous article-coating machine, the two oven structures being illustrated in this view in outline only.

Figure 1:
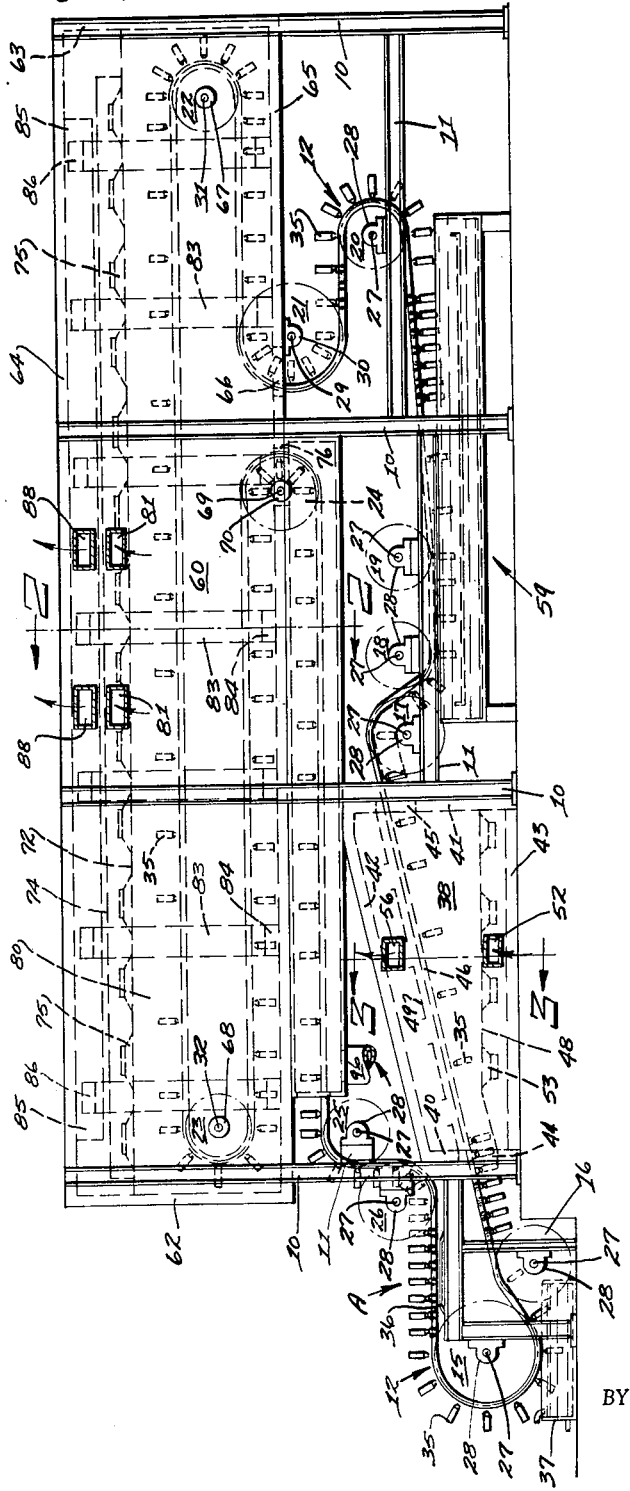
FIG. 1 is a side elevational view of a continuous article coating machine which employs the oven structure of the present invention.

Referring now to these drawings, FIG. 1 illustrates the specific embodiments of the invention being employed in a specific practical adaptation, in connection with an article-coating machine. This machine includes a frame comprised of vertical structural beams 10 and horizontal beams 11 which support the oven structure described hereinafter, and a continuous endless carriage means, generally indicated at reference numeral 12. This carriage comprises a pair of laterally spaced-apart, endless reaches of chains 13 and 14, shown on FIGS. 2 and 3, which are engaged, respectively, on the teeth of pairs of like sprockets 15, 16, 17, 18, 19, 20, a pair of bull gear drivers 21, and sprockets 22, 23, 24, 25, and 26. Of the foregoing, the pair of sprockets 15–20, inclusive, and 25 and 26, are keyed onto similar shafts 27, all of which are parallel to each other, and mounted for rotation in conventional end journal bearings 28 bolted in place on the structural beams 10 or 11 of the machine frame. The bull gears 21 are keyed onto a drive shaft 29 which is parallel with the shafts 27 and mounted for rotation in journal bearings indicated as 30. The shaft 29 is drivably connected through a coupler to a geared speed reduction unit which is driven by an electric motor (not shown). Thus, the just-described carriage means is movable continuously in one direction throughout the endless circuit described by the aforementioned sprockets and gears of the machine. The two pairs of sprockets 22 and 23 are mounted for rotation by transverse shafts, respectively numbered 31 and 32, which are likewise parallel with shafts 27 and 29. The end mountings for shafts 31 and 32 will be described hereinafter.

Referring for the moment to FIGS. 2 and 3, it is seen that the chains 13 and 14 have a number of similar cross members 33 end-connected to links of these chains for movement with the latter. Shown as mounted in each of these cross members are four similar article-holding chucks spaced therealong and numbered 34a–34d. Each of the chucks 34a–34d, respectively, as between successive cross members 33, are aligned longitudinally of the chain in four longitudinal rows thereon. Each chuck is shown holding a bottle 35. The structural details of the chucks 34 are fully set forth in my U.S. Patent 2,882,061. The chucks are shown hereon in simplified form for ease of illustration. Accordingly, the means for opening and closing the chucks for attaching or releasing an article is not shown, but, from reference to my mentioned patent, it should be readily apparent that the bottles are loaded as the plungers (not shown) of the chucks 34 are depressed by riding over a cam surface 36 at the loading station of the machine (lefthand side FIG. 1).

As shown on FIG. 1, after the bottles are loaded at station A, they are carried in a path around sprockets 15 and dipped into a solution maintained in tank 37. This solution may take the form of a primer material for surface treating the exterior of the bottle. As the carriage continues around sprockets 15 and over sprockets 16, they are brought into a preheating oven constructed according to the first form of the invention and which, according to the illustration herein in FIGS. 1 and 3, takes the following form.

The preheating oven has side walls 38 and 39, end walls 40 and 41, a roof 42, and a bottom wall 43. An opening 44 in end wall 40 provides an entrance for the carriage means 12. The opposite end wall 41 has an opening 45 which provides an exit from the oven. Intermediate the entrance and exit, the carriage means 12 is guided in a path by having chains 13 and 14, respectively, ride in U-shaped channel guides 46 and 47, which are fastened in place to the side walls 38 and 39, respectively. The walls 38, 39, 40, and 41 and the roof 42 are each constructed of suitable insulating material, such as a refractory or oven brick, to retain heat within the oven efficiently with minimum radiation heat loss.

Overlying the floor 43 in spaced relationship is a longitudinal wall member 48 of sheet metal construction. Likewise, in underlying spaced relationship to roof 42, is a longitudinal wall member 49 of sheet metal construction. The space bounded by the side walls 38 and 39, the end walls 40 and 41, and the upper wall member 49 and the lower wall member 48 comprises a central chamber 50 for the oven. The articles to be heat-treated, as may be seen from the foregoing, are conveyed longitudinally of this chamber 50 by the carriage means 12 continuously moving therethrough.

The space defined between the side walls 38 and 39, the end walls 40 and 41, the floor 43, and the lower wall member 48 comprises a longitudinal supply header 51. This header has a conduit 52 connected thereto and extends to the source of heated air supplied to the system, as will be presently described, whereby the heated air is introduced into the supply header 51. Longitudinally spaced along the supply header and attached to the wall member 48 are a plurality of air diffusers 53. These air diffusers are constructed as an air diffuser means, and, as is seen on the drawings in FIG. 3, comprise a hollow cylindrical collar 53a and integral outwardly flared sides 53b. The sides in their outer edges are fabricated about the periphery of corresponding openings through the wall member 48. Thus, heated air is admitted to the air diffuser through its collar and projected upwardly and into the central chamber 50 of the oven. As it is projected into the central chamber, the heated air is diffused in four horizontal directions while being forced upwardly toward the top of central chamber 50. The heated air thus circulated will be moved vertically throughout the central chamber 50 and across the articles (bottles 35) travelling therethrough on the carriage means 12.

In the upper wall member 49 is provided at longitudinally spaced distances a series of openings 54. The space defined by the roof 42, the upper wall member 49, and side walls 38 and 39 and end walls 40 and 41 provides a longitudinal exhaust header 55 overlying the central chamber 50. By the series of openings 54, the central chamber 50 is connected into this exhaust header 55 through the passages provided by these openings. The exhaust header 55 has an outlet conduit 56 which returns air to the hereinafter described heating system. Adjacent to the upper side of the upper wall member 49 are a plurality of slidable plate members 57. Each of the plates 57 has a corresponding series of openings 58 which are registerable with the openings 54 in the wall member 49. Guide members 59 are fabricated to the side walls 38 and 39, respectively, to hold the plate member 57 in place and provide a guide for sliding movement of the plates 57 across the wall member 49 to thereby vary the size of the openings 54 and regulate the flow of air from the central chamber 50 to the exhaust header 55. This last-described structure provides an adjustable damper means which is operative between the central chamber and the exhaust header for regulating the flow of air through the oven at various longitudinally spaced sections thereof. These dampers may be set to balance and regulate the temperature uniformly throughout the length of the central chamber 50.

After the articles have been treated in the just-described preheat oven structure, they are passed through the exit 45 and brought about the sprockets 17 of the machine. Subsequently, the carriage means moves the bottles through a dipping zone prescribed by the sprockets 18, 19, and 20. In the dipping zone, the bottles on the carriage are moved into a bath of liquid coating material, such as a vinyl resin dispersion kept at proper viscosity and temperature, for applying a satisfactory coating to the bottles. This liquid coating bath is kept in a dip tank apparatus, indicated generally at 59. Thereafter, the carriage means moves the coated articles in the path prescribed by the sprockets 20 and 21 which will introduce the articles into the curing over constructed according to the second form of the invention, and which, according to the illustration herein in FIGS. 1, 2, and 4, takes the following form.

The curing oven has side walls 60 and 61, end walls 62 and 63, a roof 64, and a bottom wall 65. As seen on FIG. 1, the oven is supported by the structural frame 10 and 11 of the machine, and is raised a substantial distance above the floor level. An opening 66 is provided in the bottom wall 65 of the oven, which forms an entrance for the carriage means 12. The walls 60–63 and 65, and the roof 64 are each constructed of suitable insulating material, such as a refractory or oven brick, to retain heat within the oven efficiently and insulate it for minimum radiation heat loss.

As previously mentioned herein, pairs of sprockets 22 and 23 are rotatably mounted, respectively, on shafts 31 and 32, disposed near opposite ends of the side walls 60—61. These shafts 31 and 32 are journal-mounted in these side walls 60 and 61 in their bearings 67 and 68. Thus, the chains 13 and 14 of the carriage are in running engagement with the sprockets 22, thence, with the sprockets 23, and thence with the sprockets 24. The foregoing arrangement provides for the carriage means to make reversing movements of travel as articles are carried thereby through the oven. The sprockets 24 are mounted for rotation with shaft 69, whch is rotatably mounted at its ends by bearings 70 held in the opposed side walls 60 and 61. The shaft 69 is parallel to the other shafts 27, 31 and 32 on the machine. An exit for the carriage means is provided by the opening 76 in the bottom wall 65 between sprockets 24.

Referring now specifically to FIG. 2, it is seen that a supply header 71 is constructed of a longitudinally disposed wall member 72 having vertical integral sides 73 and an integral sloping top wall member 74. At longitudinally spaced distances along the wall member 72, as may be seen by brief reference to FIG. 1, are a plurality of air diffusers 75. These air diffuser structures are constructed similar to those described in connection with the first form of the invention, and numbered on FIG. 2 as 75. The air diffusers, therefore, have a hollow cylindrical collar 75a and outwardly flared walls 75b. In this form of the invention, the air diffusers are disposed so that their sides, at their outer edges, are fabricated about corresponding opening through the wall member 72. Thus, heated air may be admitted to the air diffusers 75 through the collars and projected downwardly and into the overlying space of the oven. This overlying space, which is defined between the wall member 72, bottom wall 65, the end walls 62 and 63, and side walls 60 and 61, provides a central chamber of the oven indicated as 80. The air diffusers 75 open downwardly into chamber 80 for forcing heated air vertically downwardly and distributing it by diffusing the air horizontally in four directions during its downward movement toward the bottom of the chamber. Thus, the heated air is circulated across the articles 35 carried longitudinally of the chamber by the carriage means 12. The supply header 71 receives heated air through the two conduits 81 which are supplied from the air heating system to be presently described. At spaced longitudinal distances along the side walls 60 and 61 are vertical air exhaust ducts 82 and 83 (FIG. 1). Each of these ducts is provided with openings 84 near their lower end which connect the ducts with the bottom region of central chamber 80. The air-exhaust ducts 82 and 83 extend vertically to near the top of the oven, whereas they are connected into an overhead longitudinal exhaust header 85 which extends substantially the length of the oven (FIG. 1). These latter connections are made by passages 86 between the top end of air-exhaust ducts 83 and exhaust header 85, and passages 87 between the top end of air-exhaust ducts 82 and exhaust header 85. The exhaust header 85 is connected to the outside of the oven by conduits 88.

As seen on FIGS. 2 and 4, an adjustable damper means is operative in the air-exhaust ducts 82 and 83 for regulating the flow of air through the oven. These adjustable damper means comprise a butterfly damper member 89 pivotably mounted on a shaft 90 extending through the side walls 60 or 61. At the outer end of the shaft 90 is an attached handle 91 manually operable for adjusting the damper setting in each of the air-exhaust ducts 82 or 83.

Referring briefly to FIG. 1, it is seen that the carriage means, as it travels about the spaced sprockets 23, then travels over the spaced sprockets 24, which, in reversing direction thereabout, removes the heat-treated articles from the curing oven through its exit opening 76. Adjacent the underside of the bottom wall 65 of the curing oven is an elongated longitudinally disposed cooling tunnel 92 which has an entrance coextensive with the exit 76 from the overhead oven. The carriage means will then bring the heat-treated articles into the cooling tunnel 92, and the chains 13 and 14 will run in the U-shaped guide members 93 and 94 fixed along the length of the cooling tunnel. At the end of the tunnel opposite the mentioned entrance is an exit opening 95 through which the carriage means advances the articles and brings them about the spaced sprockets 25 and sprockets 26, whereupon the treated articles are removed from the carriage and other articles loaded in their place at the loading station A. Cooling wind is forced into the cooling tunnel through the pipe inlet 96 located adjacent the exit end of the cooling tunnel 92. The cooling wind may be supplied by any conventional means, such as a blower (not shown), and the wind thus supplied is forced by a flow counter to the movement of the articles as they are carried along the tunnel 92. This counter flow of cooling wind will cool the articles as they travel therethrough after they have been heat-treated during their travel through the central chamber 80 of the oven.

Referring now to FIG. 5, the heater systems for serving both the preheat oven and the curing oven will be described. A platform 97, supported by the structural frame 98, provides a mounting for a vertical air heater 100. One such air heater which may be used is a No. 5 Lanly vertical heater, which receives air through the intake 101 and heats it while moving therethrough. The heated air is then piped to the inlet 102a of a blower 102, which forces the air through its outlet 103 through the conduit 52 and into the supply header 51 of the preheat oven. One blower which may be used is a Buffalo No. 400 fan rated at 5 H.P. at 1750 r.p.m. As may be seen from FIG. 3, the heated air thus supplied to header 51 is forced through the anemostats 53 and into the central chamber 50 of the preheat oven. The air is diffused by the air diffusers, as indicated by the arrows, and fed upwardly through the chamber 50 into the outlets 54 which are controlled by the dampers 57. The air, as it is circulated, is then fed to the exhaust header 55 and into the conduit 56, which returns the air to the inlet port 101 of the vertical air heater 100.

The platform 97 also provides a support for an air heater 104. One such air heater which may be used is a No. 76 Lanly horizontal heater. The air heated therein is connected to the intake side of a blower 105, at its inlet 105a and forced through its outlet 109 connected to the conduits 81. Thus, as may be seen on FIG. 2, the heated air is forced into the supply header 71, through the anemostats 75, and downwardly in the central chamber 80 of the curing oven, wherein it is diffused and distributed in a manner indicated by the arrows. The air passes from chamber 80 through the openings 84 and along the vertical exhaust ducts 82 and 83 into the exhaust header 85, from which the air is returned through the conduit 88, and into the inlet 106 of the air heater 104.

The just-described heating system provides for recirculation of air continuously through either form of the oven structure illustrated in the present invention.

It will, of course, be understood that various details of construction of the foregoing oven structures may be modified through a wide range without departing from the principles of this invention, and it is not the purpose to limit the patent granted hereon otherwise than necessitated by the scope of the appended claims.

We claim:

1. An elongated oven structure comprising in combination side, end, top and bottom walls of insulating refractory material defining a central chamber, a pair of spaced apart parallel endless reaches of chain, a plurality of cross members attached at their ends to said chains for carriage thereby, a plurality of article chucks carried on said cross members for holding and conveying articles thereby, transverse shafts mounted near each end of said central chamber, a pair of spaced apart sprockets on each shaft, an entrance to said chamber, an exit from said chamber, the said parallel chains continuously moving through the entrance, respectively, around said sprockets at opposite ends of the chamber and through the exit in a reversing path of travel longitudinal of said chamber, a longitudinally disposed supply header along the top of said chamber, an air heater, a blower, conduit connections between said heater and the blower and the blower and said supply header, a plurality of air diffusers housed in said supply header and spaced longitudinally therealong and each connected into said central chamber for distributing air supplied from said heater downwardly through said chamber and across articles traveling therethrough, a plurality of air exhaust ducts connected into said central chamber near the bottom thereof and extending vertically upwardly along the sides of said chamber, a longitudinally disposed exhaust header and interiorly disposed in the oven structure overlying said supply header, each of the said air exhaust ducts being connected into said exhaust header, a conduit connection between said exhaust header and said air heater, and adjustable dampers in each of said exhaust ducts for regulating the flow of air therethrough.

2. The oven structure defined in claim 1, including in combination therewith a cooling tunnel having an entrance adjacent said exit from the central chamber of the oven, said tunnel having an exit and constructed and arranged to laterally encompass said parallel reaches of chains, whereby the latter travels continuously therethrough from said tunnel entrance to its said exit, means for supplying cooling air into said tunnel near its said exit for forcing a counter flow of cooling air therealong towards its said entrance for cooling articles traveling therethrough after being heated during travel through said oven central chamber.

3. An elongated oven structure comprising in combination a pair of spaced apart parallel endless reaches of chain, a plurality of cross members attached at their ends to said chains for carriage thereby, a plurality of article chucks carried on said cross members for holding and conveying articles thereby, an insulated structure defining a central chamber having an entrance and an exit and arranged for movement of said parallel chains therethrough, guide means for said chains defining a path for travel through said chamber between its said entrance and exit, a supply header disposed longitudinally of said chamber and interiorly thereof, an air heater, a blower, conduit connections between said heater and said blower and said blower and said supply header, a plurality of inwardly directed air diffusers housed in said supply header and spaced longitudinally therealong and each connected into said central chamber for distributing air supplied from said heater vertically through said chamber and across articles traveling therethrough, an exhaust header disposed longitudinally of said central chamber and interiorly thereof and in overlying relationship to said supply header, a plurality of conduit connections between said chamber and said exhaust header for movement of air from said chamber to the exhaust header comprising defined passages therebetween, a conduit connection for returning air from said exhaust header to said air heater, and a plurality of dampers each comprising a plate member having therein defined openings adapted for registry with said passages connecting the central chamber and the exhaust header and a slideable mounting for said plate members in cooperating relationship with said last named passages for regulating the flow of air from said central chamber to said exhaust header.

4. An elongated oven structure comprising side, end, top and bottom walls of insulating material defining a central chamber having an entrance and an exit thereto, carriage means for reversingly conveying articles to be treated by continuously moving them through the chamber entrance, back and forth longitudinally of said chamber and through said chamber exit, a plurality of air diffusers spaced longitudinally of said chamber and disposed for directing heated air downwardly across said chamber and past the articles being moved therein, an overhead duct into which said air diffusers are each connected, said duct being disposed interiorly of the structure defining said chamber and near the top of that structure, a heat supply conduit connected from the exterior through a side wall of said structure and to said duct, an air heater, a forced air blower operatively connected to said heater and to said heat supply conduit, a separate top duct in overlying relationship to said overhead duct that is disposed longitudinally of said chamber and intermediate said top wall of the oven structure and said overhead duct, vertical duct means along the side walls of said chamber and connecting the chamber and said separate top duct, an air exhaust duct connection extending between the intake side of said air heater and the said separate top duct, whereby a closed system for recirculation of air vertically of said chamber is established for thermal conservation of the heat supplied to the oven structure.

5. The oven structure defined in claim 4, wherein said vertical duct means comprises a plurality of elongated conduits, each connected at one end to the bottom region of said chamber and the other end thereof connected to said separate top duct for exhaust, said conduits being spaced longitudinally along the interior of said chamber and extending vertically adjacent opposite sides of said chamber.

6. The oven structure defined in claim 5, wherein damper means is provided in each of said plural conduits and comprises individual butterfly dampers and an adjusting lever individual to each damper for moving the latter between opened and closed positions, said dampers collectively providing a means for regulating the temperature uniformly within said chamber.

7. An elongated oven structure comprising in combination a pair of spaced apart parallel endless reaches of chain, a plurality of cross members attached at their ends to said chains for carriage thereby, a plurality of article chucks carried on said cross members for holding and conveying articles thereby, an insulated structure defining a central chamber having an entrance and an exit and arranged for movement of said parallel chains therethrough, a supply header disposed longitudinally of said chamber and interiorly thereof, an air heater, a blower, conduit connections between said heater and said blower and said blower and said supply header, a plurality of inwardly directed air diffusers housed in said supply header and spaced longitudinally therealong and each connected into said central chamber for distributing air supplied from said heater vertically through said chamber and across articles traveling therethrough, an exhaust header disposed longitudinally of said central chamber and interiorly thereof and in overlying relationship to said supply header, means connecting said chamber and said exhaust header for movement of air from said chamber to the exhaust header, a conduit connection for returning air from said exhaust header to said air heater, and adjustable damper means for regulating the flow of air from said chamber to said exhaust header.

References Cited in the file of this patent
UNITED STATES PATENTS

| | | |
|---|---|---|
| 948,751 | Whitlatch | Feb. 8, 1910 |
| 1,569,191 | Lathrop et al. | Jan. 12, 1926 |
| 1,779,622 | Dreffein | Oct. 28, 1930 |
| 1,910,868 | Webb | May 23, 1933 |
| 2,045,259 | Batchell | June 23, 1936 |
| 2,368,130 | Fox | Jan. 30, 1945 |
| 2,385,962 | Barnett | Oct. 2, 1945 |
| 2,573,217 | Parmelee | Oct. 30, 1951 |
| 2,599,721 | Remington et al. | June 10, 1952 |
| 2,844,825 | Gaurke | July 29, 1958 |